S. R. DU BRIE.
APPARATUS FOR SUPPLYING FUEL TO GAS ENGINES.
APPLICATION FILED JAN. 4, 1907.
906,783.
Patented Dec. 15, 1908.
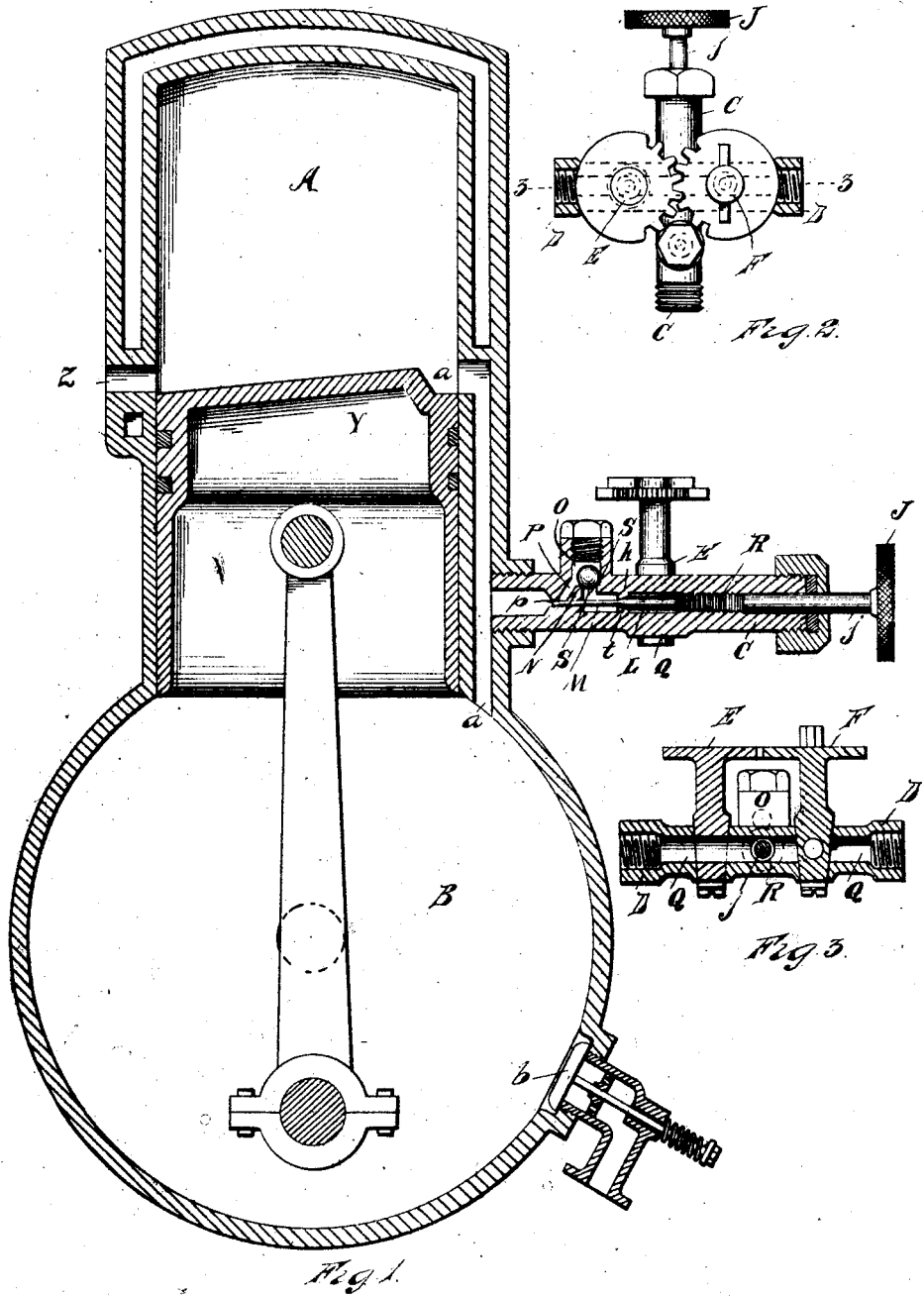
WITNESSES
INVENTOR
Stanley R. Du Brie
By Parker & Burton Attorneys.

UNITED STATES PATENT OFFICE.

STANLEY R. DU BRIE, OF DETROIT, MICHIGAN.

APPARATUS FOR SUPPLYING FUEL TO GAS-ENGINES.

No. 906,783.  Specification of Letters Patent.  Patented Dec. 15, 1908.

Application filed January 4, 1907. Serial No. 350,756.

*To all whom it may concern:*

Be it known that I, STANLEY R. DU BRIE, a citizen of the United States, residing at Detroit, county of Wayne, State of Michigan, have invented a certain new and useful Improvement in Apparatus for Supplying Fuel to Gas-Engines, and declare the following to be a full, clear, and exact description of the same, such as will enable others skilled in the art to which it pertains to make and use the same, reference being had to the accompanying drawings, which form a part of this specification.

My invention relates to apparatus for supplying fuel to gas engines, and consists in the improvements hereinafter described and claimed, and shown in the accompanying drawings, in which:—

Figure 1, is a vertical section of a two-cycle gas engine, and an apparatus embodying my invention attached thereto. Fig. 2, is a plan view of the feeding apparatus. Fig. 3, is a section in the plane indicated by the line 3—3 Fig. 2.

A is a cylinder, and B the crank case.

Y is a piston adapted to reciprocate in the cylinder A.

a, a, is the by-pass through which the charge is forced into the cylinder.

Z is the exhaust port.

b is a check valve through which air is taken into the crank case.

C, C, D, D, is a cruciform casting made up of the intersecting arms C, C, and D, D. The arm C, C, is screw threaded at one end, the threads engaging with threads on the wall of an aperture through the wall of the by-pass a, a. There is a passage extending axially and longitudinally through the arm C. K is a partition in said passage, and N is a second partition in the same. There is a lug extending upward from the arm C; said lug is bored out axially, and screw threaded, and the aperture thus formed extends into the wall of the arm C and is normally closed by a screw threaded plug, thus forming a chamber in the wall of said arm.

P is an aperture drilled slantingly through the partition N, the drill being extended inward through the aperture O.

s, is a passage extending vertically from the aperture in the lug O to the passage in the arm C, the aperture and passage P and s forming a communication past the partition N.

S, is a ball adapted to act as a valve and close the upper end of the passage s, so that the fluid cannot run backward therethrough. The passage s may be drilled, the drill passing down in the aperture O.

p, is a passage formed coaxial with the arm C through the partition N, and t is a passage in line with the passage p through the partition K. This passage t is of greater diameter than the passage p, and is reamed out conically to form a seat for a needle valve hereinafter described.

J, is the thumb piece, and j, the spindle of a needle valve provided with threads R adapted to engage with threads in the passage through the arm C.

L, is a conical portion of the needle valve J, j, adapted to seat against the conical walls of the aperture in the partition K.

M, is a small cylindrical extension of the spindle j. The extension M is co-axial with the spindle j and extends through the aperture t, and acts to close and open the lower end of the aperture P, according to the position of the spindle j.

The arm D, D, has an aperture Q formed through it co-axially therewith, and at its ends said arm is provided with screw threads adapted to receive the ends of pipes for supplying, at one end kerosene, alcohol or other fluid requiring a relatively high temperature to vaporize it, and at the other end a pipe to supply gasolene. The aperture Q, through the arm D, D, communicates with the passage through the arm C, C. There is a cock E in the aperture Q upon one side of the passage through the arm C, C, and a cock F in said aperture on the other side of said passage. One of these cocks opens, closes and regulates the passage of the kerosene or alcohol, and the other of said cocks regulates the passage of gasolene. Upon the upper ends of the spindles of the cocks E and F are disks, which are provided with teeth at their periphery, which teeth mesh with each other. The engagement of these disks hold the plugs or stems of the cocks E and F in such relative positions that when one of said cocks is closed, the other is open, and the movements of the two spindles are simultaneous.

Because of the large amount of heat required for the vaporization of alcohol or kerosene, it is difficult to start an engine using such fluids when the parts are cold, therefore it is desirable to start the engine with a volatile fluid like gasolene, and run the same until it becomes thoroughly heated up, and then turn on the kerosene or alcohol. In the device above described, this object is conveniently accomplished, the passage for gasolene being first opened, closing the passage for kerosene, and the engine is started with this fluid. After having got the engine well in motion and well warmed up, the gasolene is turned off, this action opening the passage for kerosene or alcohol.

The supply to the engine is regulated by the needle valve J, j, the conical portion L regulating the supply of fluid which passes to the valve S and the extension M regulating the opening through the aperture P, and therefore the strength of draft of the engine on the valve S, so that both the suction and supply is regulated by the same valve. The ball S acts to prevent the running back of the fluid, and it also serves to spray or atomize the fluid passing through the passage s past said valve.

The portion of the passage through the arm C, C, which is between the partitions K and N is formed by coring; the passage from the right hand end of said arm is drilled, and the threads cut therein. The aperture P and passage s are formed by drills passing through the aperture O, and the valve seat on the upper end of the passage s is formed by a tool passing into said aperture. Thus the form of the supply apparatus is such that the same may be made conveniently, cheaply, and accurately.

What I claim is:—

1. In an apparatus of the kind described, the combination of an arm, a passage therethrough, a chamber in the wall of said arm, an inlet from said passage to said chamber, and an outlet from said chamber to said passage, a valve in said chamber adapted to control the inlet passage, and means for regulating the capacity of the passage to said inlet and said outlet.

2. In an internal combustion engine, the combination of a conduit for supplying air to the cylinder, a liquid fuel supply passage communicating with said conduit, a communication between the delivery end of said passage and said conduit, a non-return valve located at the delivery end of said passage, and means for adjusting the size of the communication between said valve and the conduit.

3. In an internal combustion engine, the combination of a conduit for supplying air to the cylinder of the engine, a liquid fuel supply passage communicating with said conduit, a communication between the delivery end of said passage and said conduit, a non-return valve located at the delivery end of said passage, means for regulating the size of the communication between said valve and said conduit, and means for regulating the rate at which the liquid may pass to said valve.

4. The combination of an arm provided with an aperture in the wall thereof, a passage through said arm, a partition in said passage adjacent to said aperture, said arm being provided with an opening extending from said passage on one side of said partition to the aperture in the wall of said arm, and a passage extending from said aperture to said passage upon the other side of said partition, said openings being so located that they may be formed by a drill passing from the outside through said aperture in the wall of said arm.

5. A combination of an arm, a passage therethrough, a chamber in the wall of said arm, a partition in said passage adjacent to said chamber, an aperture communicating with said passage on one side of said partition and with the chamber in the wall of said arm, a passage communicating with the chamber in the wall of said arm and with the passage through said arm, on the other side of said partition, and a non-return valve in the chamber in the wall of said arm.

6. A combination of an arm, a passage therethrough, a chamber in the wall of said arm, a partition in said passage adjacent to said chamber, an aperture communicating with said passage on one side of said partition and with the chamber in the wall of said arm, a passage communicating with the chamber in the wall of said arm and with the passage through said arm, on the other side of said partition, a non-return valve in the chamber in the wall of said arm, and means for simultaneously controlling the inlet and outlet to and from the chamber in the wall of said arm.

7. A combination of an arm, a passage therethrough, a chamber in the wall of said arm, a partition in said passage adjacent to said chamber, an aperture communicating with said passage on one side of said partition and with the chamber in the wall of said arm, a passage communicating with the chamber in the wall of said arm and with the passage through said arm, on the other side of said partition, a non-return valve in the chamber in the wall of said arm, a second partition in the passage through said arm having a port and valve seat therein, an axial passage through the first named partition, and a valve spindle adapted to adjust the opening through the second partition and extending into said axial passage to adjust the opening through the passage extending from the chamber in the wall of said arm to said passage through said arm, substantially as and for the purpose described.

8. The combination of a liquid fuel passage, means for properly delivering the fuel from said passage, two other passages communicating with the first named passage, means for supplying a light liquid fuel through one of said two passages, and means for supplying a heavier liquid fuel through the other of said two passages, a cock in each of the last named passages, a spindle on each of said cocks, and means for gearing said spindles together so that they shall rotate together, said spindle and connecting mechanism being arranged so that one cock shall be closed when the other is open.

9. In a gas engine, the combination of a cylinder, two liquid fuel supply passages communicating with said cylinder, means for supplying a light liquid fuel through one of said two passages, and means for supplying a heavier liquid fuel through the other of said two passages, a means for regulating the flow of liquid located in each of said passages, and means for connecting said regulating means so that they shall move simultaneously and one shall be closed when the other is open.

In testimony whereof, I sign this specification in the presence of two witnesses.

STANLEY R. DU BRIE.

Witnesses:
ALICE TOWNSEND,
ELLIOTT J. STODDARD.